United States Patent [19]

Hollenbach et al.

[11] Patent Number: 5,510,970
[45] Date of Patent: Apr. 23, 1996

[54] LAMP

[75] Inventors: Gerald A. Hollenbach; Patrick McLean, both of Aloha, Oreg.

[73] Assignee: Ranger Enterprises, Inc., Aloha, Oreg.

[21] Appl. No.: 986,432

[22] Filed: Dec. 4, 1992

[51] Int. Cl.$^6$ ............................................. F21V 21/08
[52] U.S. Cl. ........................ 362/396; 362/275; 362/287; 362/368; 362/376; 362/427; 248/278.1
[58] Field of Search ............................ 362/396, 275, 362/287, 419, 376, 285, 368, 418, 427; 248/231.8, 276, 278

[56]  References Cited

U.S. PATENT DOCUMENTS

| | | | |
|---|---|---|---|
| D. 141,063 | 5/1945 | Kiplock | D26/60 |
| D. 158,904 | 6/1950 | Smith | D26/63 |
| D. 204,792 | 5/1966 | Collings | D26/60 |
| D. 251,751 | 5/1979 | Lawrence et al. | D26/119 |
| D. 287,644 | 1/1987 | Gierke | D26/60 |
| D. 289,929 | 5/1987 | Langlands | D26/37 |
| 1,562,994 | 11/1925 | Stewart | 248/231.5 |
| 1,606,219 | 9/1926 | Havens | 362/280 |
| 1,722,773 | 7/1929 | Stewart | 362/396 |
| 1,954,756 | 4/1934 | Kidston et al. | 362/392 |
| 2,034,913 | 3/1936 | Kros | 362/396 |
| 2,085,683 | 6/1937 | McGill | 362/396 |
| 2,087,812 | 7/1937 | Peluse | 362/396 |
| 2,247,022 | 6/1941 | Hovorka | 362/396 |
| 2,569,068 | 9/1951 | Maxwell | 362/344 |
| 2,691,721 | 10/1954 | Bornhuetter | 362/430 |
| 3,368,068 | 2/1968 | Cronheim | 362/275 |
| 3,872,428 | 3/1975 | Boisvert | 362/396 |
| 4,090,210 | 5/1978 | Wehling et al. | 362/419 |
| 4,236,195 | 11/1980 | Kovacik | 362/376 |
| 4,399,498 | 8/1983 | Bacevius | 362/396 |
| 4,413,312 | 11/1983 | Morkosky, Sr. et al. | 362/269 |
| 4,414,613 | 11/1983 | Mayer | 362/267 |
| 4,432,042 | 2/1984 | Zeller | 362/419 |
| 4,494,177 | 1/1985 | Matthews | 362/402 |
| 4,639,842 | 1/1987 | Upchurch | 362/376 |
| 4,661,892 | 4/1987 | Reed, Jr. | 362/396 |
| 4,661,895 | 4/1987 | Hull | 362/427 |
| 4,678,153 | 7/1987 | Maddock et al. | 248/229 |
| 4,802,074 | 1/1989 | Puschkarski | 362/396 |
| 4,985,817 | 1/1991 | Yale | 362/396 |
| 5,097,400 | 3/1992 | Cvek | 362/287 |
| 5,163,751 | 11/1992 | Bottiglieri | 362/376 |
| 5,180,220 | 1/1993 | Van Kalsbeek | 362/396 |
| 5,195,823 | 2/1993 | Sidabras | 362/387 |
| 5,205,645 | 4/1993 | Lee | 362/431 |
| 5,243,507 | 9/1993 | Atkins et al. | 362/376 |

FOREIGN PATENT DOCUMENTS

| | | | |
|---|---|---|---|
| 1313532 | 11/1962 | France | 362/376 |
| 0603893 | 10/1934 | Germany | 362/376 |

OTHER PUBLICATIONS

The Designers Edge 1990 Halogen Utility Lamp Program, Aug. 1990.
The Designers Edge 500 watt Halogen Flood Light Fixture—item No. L–30 Aug. 1990.
The Designers Edge Heavy Duty Deluxe 500 watt Hinged Face Halogen Flood Light Fixture—Item L–31, Aug. 1990.
The Designers Edge 500 watt Hinged Face Halogen Flood Light Fixture—Item No. L–31 Special, Aug. 1990.
The Designers Edge 500 watt Portable Yard Light—Item No. L–17, Aug. 1990.
The Designers Edge L–17 Price Schedule, Aug. 1990.
The Designers Edge 500 watt Tri–Pod Based Halogen (List continued on next page.)

*Primary Examiner*—Denise L. Gromada
*Assistant Examiner*—Alan B. Cariaso
*Attorney, Agent, or Firm*—William A. Birdwell & Associates

[57] ABSTRACT

A lamp employs a halogen light fixture which includes a fitting threadably engaging a conduit entry "L". A standard electrical cord is provided to the entry "L" and connects inside the entry "L" with the pigtail wiring of the light fixture. The entry "L" also receives a spring clamp, securely mounted thereon, for enabling the lamp to mount to a support via use of the spring clamp, for providing a work lamp on a temporary or semi-permanent basis at a work site.

52 Claims, 1 Drawing Sheet

OTHER PUBLICATIONS

Utility Work Lamp—Item No. L-9 Oct. 1990.

The Designers Edge L-9 Pricing Schedule Oct. 1990.

The Designers Edge 500 watt Tri-Pod Based Halogen Utility Work Lamp w/"Lifetime" Switch—Item No. L-7, Oct. 1990.

The Designers Edge L-7 Pricing Schedule, Oct. 1990.

The Designers Edge 500 watt Tri-Pod Based Halogen Utility Work Lamp w/Switch & 110 volt outlet–Item No. L-8, Oct. 1990.

The Designers Edge L-8 Pricing Schedule, Oct. 1990.

Correspondence from UL International Services, Ltd. Engineering Services—Ref. E127429, 90NK90316/L-9, Oct. 1990.

The Designers Edge Promotional S-Tube 500 watt Halogen Utility Lamp—Item No. L-18, Aug. 1990.

The Designers Edge L-18 Price Schedule, Aug. 1990.

The Designers Edge Deluxe 4 Leg Base 500 watt Halogen Work Light w/On-Off Switch—Item L-12, Aug. 1990.

The Designers Edge L-12 Price Schedule, Aug. 1990.

The Designers Edge Promotional 500 watt Telescoping Halogen Lamp—Item No. L-19, Aug. 1990.

The Designers Edge L-19 Price Schedule, Aug. 1990.

The Designers Edge Deluxe 500 watt Dual Base Halogen Quartz Lamp—Item No. L-20, Aug. 1990.

The Designers Edge 500 watt Portable Deluxe Telescoping Halogen Work Light—Item No. L-11, Aug. 1990.

The Designers Edge L-11 Price Schedule, Aug. 1990.

The Designers Edge Industrial 500 watt Telescoping Halogen Utility Lamp— Item No. L-13, Aug. 1990.

The Designers Edge L-13 Price Schedule, Aug. 1990.

The Designers Edge "1000 watt Powerlite" Heavy Duty Twin Head Quartz Halogen Utility Lamp—Item No. L-15, Aug. 1990.

The Designers Edge L-15 Price Schedule, Aug. 1990.

The Designers Edge "1000 watt Powerlite" Cart Model Heavy Duty Twin Head Quartz Halogen Utility Lamp with 110 volt outlet—Item No. L-29, Oct. 1990.

The Designers Edge L-29 Price Schedule, Oct. 1990.

Leen & Associates Letter, dated Jun. 24, 1988, to John Windham w/Lumberman's, Jul. 1988.

Lumberman's Building Center Purchase Order No. 60279 dated Jul. 22 Issued to Leen & Associates Jul. 1988.

Leen & Associates Contemporary Round Bank Clamp on Lite–Item No. L-5502, Oct. 1990.

The Designers Edge Calmp on Lamp w/Flexible Arm—Item No. L-5503, Oct. 1990.

Leen & Associates Clamp on Light—Item No. L-5507, Oct. 1990.

Leen & Associates Clamp on Lite—Item No. L-5505, Oct. 1990.

Leen & Associates Clamp on Lite—Item No. L-5504, Oct. 1990.

The Designers Edge 1990 Halogen Utility Lamp Program.

The Designers Edge 500 watt Tri-Pod Based Halogen Utility Work Lamp— Item No. L-9, 1990.

The Designers Edge 500 watt Tri-Pod Based Halogen Utility Work Lamp w/"Lifetime" Switch—Item No. L-7, 1990.

The Designers Edge Promotional S-Tube 500 watt Halogen Utility Lamp—Item No. L-18, 1990.

The Designers Edge Promotional 500 watt Telescoping Halogen Lamp—Item No. L-19, 1990.

ved to be perma-

LAMP

BACKGROUND OF THE INVENTION

This invention relates to lighting and more particularly to a halogen light fixture with clamping means for removably mounting the fixture.

A standard halogen light fixture has a threaded fitting from which electrical supply wires project. It is intended that the halogen fixture then be permanently mounted to an electrical box, for example, on the outside of a house to provide security illumination for the house. The fixtures are not provided with plugs which would allow them to be connected to conventional household receptacles, but instead have pigtail wires which are intended to be permanently wired by an electrician to an electrical supply.

It is often desirable to employ a halogen lamp for work site illumination on a temporary basis, not as a permanent installation. A conventional work lamp is connected to the utility supply through a standard plug and receptacle. Because the standard halogen fixture is not equipped with a plug, it is not suited for use with a standard household receptacle as a portable work lamp.

SUMMARY OF THE INVENTION

A lamp according to the present invention includes a halogen light fixture with a threaded fitting from which pigtail electrical supply wires extend. The threaded fitting is engaged with a conduit entry "L" to provide a base member. A three-wire electrical cord supplies electricity to the entry "L" for connection with the lamp pigtails. A spring clamp is securely attached to the entry "L" for enabling the resulting apparatus to be mounted as a work lamp on a temporary or semi-permanent basis at a work site by squeezing the clamp and placing the clamp jaws over a support. The electrical cord may then be connected to a standard electrical outlet for providing power to the lamp.

The subject matter of the present invention is particularly pointed out and distinctly claimed in the concluding portion of this specification. However, both the organization and method of operation, together with further advantages and objects thereof, may best be understood by reference to the following description taken in connection with accompanying drawing wherein like reference characters refer to like elements.

BRIEF DESCRIPTION OF THE DRAWINGS

The drawing is a side view of an embodiment of the lamp according to the present invention.

DETAILED DESCRIPTION

Figure 1:
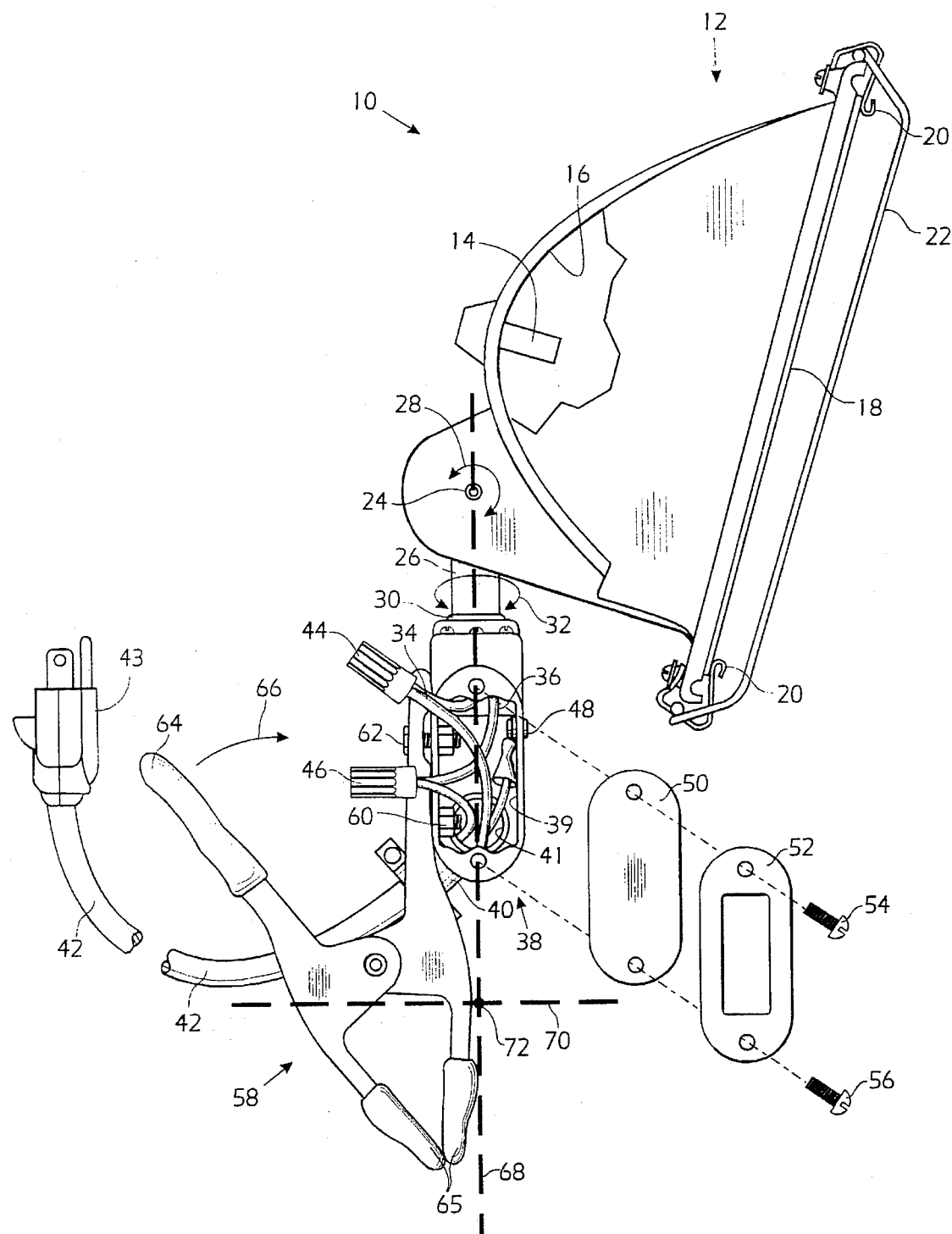

Referring to the drawing, a lamp 10 includes a halogen light fixture 12 which contains a halogen light source 14 within a reflector cavity 16. The light fixture may also include a glass face plate 18 held in relation to the body of the fixture via mounting clips 20. A wire guard 22 mounted in spaced relation with the face plate glass 18 protects the glass against breakage from impact if, for example, the lamp is bumped. The light fixture carries mounting swivel 24 which engages a fitting rod 26 for enabling the light fixture to pivot as illustrated by arrows 28. The fitting rod 26 may also include a rotatable joint 30 disposed centrally of the fitting rod allowing the light fixture to rotate about the longitudinal axis of the fitting rod as indicated by arrows 32. The end of rod 26 distal from the light fixture includes an opening (not illustrated) wherein electrical wires 34 and 36 enter, extending up through the hollow center of rod 26 into the interior of the light fixture so as to provide a supply of electricity to light source 14 within the fixture. The fitting 26 is threaded at the distal end thereof and engages a threaded receptacle of conduit entry "L" 38 which is employed as a base housing. The entry "L" is a standard part used to allow entry of wires into an electrical conduit and includes opening 39 on a face thereof for allowing access to the interior and is substantially hollow for allowing the pigtail wires 34 and 36 to be contained therewithin. In a particular embodiment, the entry "L" is a one-half inch entry "L" with an internal volume of 1.8 cubic inches. The entry "L" has an opening 41 located at a face of the end distal from the threaded receptacle and receives a one-half inch by three-eighth inch squeeze "L" 40 which provides support to electrical cord 42. The electrical cord is thereby allowed to pass through the opening into the entry "L" via the squeeze "L". In one embodiment, the electrical cord is a three-wire medium capacity electrical cord having sixteen gauge wiring. The far end of the cord terminates in a standard three-prong plug 43 which is adapted to be inserted into a conventional household electrical outlet.

Within the interior of the entry "L", the electrical cord joins with wires 34 and 36 via wire connectors 44 and 46, while the ground lead of the electrical cord is electrically connected to the body of the entry "L", for example by a rivet 48, thereby providing a grounded connection.

Water resistant gasket 50 suitably covers opening 39 of the entry "L" and cover plate 52 mounts the gasket 50 to the body of the entry "L", with the gasket held between the cover plate and the entry "L". Screws 54 and 56 maintain the cover plate in tight engagement with the gasket and the body of the entry "L".

Mounting of the lamp at a work site is accomplished via spring clamp 58 which is secured to the body of the entry "L", for example via nut and bolt combinations 60 and 62. The spring clamp is mounted so as to extend with its clamp jaws oriented away from the light fixture. However, this is not a requirement, and it may be desirable in some applications to have the clamp jaws adjacent the light fixture or at some angle in relation thereto.

When compared to a standard Cartesian coordinate system, as is commonly known in the art, the lamp of the invention can be seen to have an elongate, or 'X,' axis 68, a first lateral, or 'Y,' axis 70, and a second lateral, or 'Z,' axis 72, perpendicular to the first lateral axis and to the plane of the drawing. Since the two clamp jaws 65 are pivotally hinged in the second lateral axis, they open substantially along the first lateral axis. It can also be seen that, in the preferred embodiment shown in the drawing, the clamp 58 extends away from the halogen light fixture along the elongate axis in substantially the same direction as the elongate support member formed by the fitting rod 26 and the base housing 38.

To use the lamp according to the present invention, clamp handle 64 is squeezed in the direction of arrow 66, causing the spring within the clamp to compress, thereby opening the clamp jaws 65. The clamp jaws are then placed over a support structure to which the lamp is to be mounted, whereupon the clamp handle is released, which allows the clamp spring to urge the clamp jaws shut. The force of the clamp spring will then maintain the clamp jaws shut until such time as the clamp handle is again depressed. The lamp may then be swiveled about swivel 24 and rotated around rotation joint 30 to provide a desired orientation and direction for optimal lighting conditions.

It will be appreciated that the invention is not restricted to the particular embodiment that has been described, and that variations may be made therein without departing from the scope of the invention as defined in the appended claims and equivalents thereof. For example, while a halogen lamp has been shown, other light sources may be employed.

We claim:

1. A lamp, comprising:

a halogen light fixture;

a clamp connected to said halogen light fixture, said clamp having two pivotally-connected jaws forced toward one another by spring tension and a handle for spreading said jaws, said clamp extending away from said halogen light fixture;

an electrical connection housing associated with said halogen light fixture;

halogen light source wires extending out of said halogen light fixture into said electrical connection housing for supplying electricity to said halogen light source; and an electrical power cord having power cord wires therein for connecting said lamp to a power source, said power cord wires being connected to said halogen light source wires within said electrical connection housing.

2. The lamp of claim 1, further comprising an elongate support member having a first end and a second end, and being connected at said first end to said halogen light fixture and at said second end to said clamp, said electrical connection housing being disposed in said elongate support member.

3. The lamp of claim 2, wherein said halogen light fixture, elongate support member and clamp are made of metal, and said power cord includes a ground wire electrically connected to said fixture.

4. A lamp, comprising:

a light fixture, having a cavity therein for housing a light so opening in said fixture to said cavity;

a guard disposed over said opening; and a clamp connected to said light fixture, said clamp having two jaws forced toward one another by spring tension, a first of said two clamp jaws being rigid and connected to said light fixture such that there are a plurality of orthogonal pivot axes there being only one pivot axis for each pivot direction, and the second of said two clamp jaws being pivotally connected at a first pivot point to said first clamp jaw, said clamp further including a spring connected to said first and second clamp jaws and a handle for spreading said jaws.

5. The lamp of claim 4, wherein said handle is connected to said second of said two clamp jaws at said first pivot point.

6. The lamp of claim 4, further comprising an elongate support member having a first end connected to said light fixture and a second end connected to said clamp.

7. The lamp of claim 6, wherein said support member and said first of said two clamp jaws have respective elongate axes extending in substantially the same dimension.

8. The lamp of claim 7, wherein elongate support member is pivotally connected at a second pivot point to said light fixture and said elongate axes of support member and said first of said two clamp jaws pass substantially through said second pivot point.

9. The lamp of claim 4, wherein said light source is a halogen light bulb, said light fixture having glass disposed over said cavity opening.

10. The lamp of claim 9, wherein said guard and said glass are connected to said light fixture by common attachment means.

11. The lamp of claim 10, wherein said guard comprises a wire grill.

12. The lamp of claim 4, wherein said guard comprises a wire grill.

13. A lamp, comprising:

a light fixture, having a cavity therein for housing a light source and having an opening in said fixture to said cavity;

a guard disposed over said opening;

a clamp connected to said light fixture, said clamp having two jaws forced toward one another by spring tension;

an electrical connection housing associated with said light fixture;

light source wires running from within said light fixture to within said electrical connection housing for supplying electricity to said light source; and an electrical power cord having power cord wires therein for connecting said lamp to said power source, said power cord wires being connected to said light source wires within said electrical connection housing.

14. The lamp of claim 13, further comprising an elongate support member having a first end and a second end, and being connected at said first end to said light fixture and at said second end to said clamp, said electrical connection housing being disposed in said support member, said light source wires passing from said light fixture to said electrical connection housing.

15. The lamp of claim 14, wherein said light fixture, support member and clamp are made of metal, said power cord including a ground wire electrically connected to said fixture.

16. A lamp, comprising:

a light fixture, having a cavity therein for housing a light source and having an opening in said fixture to said cavity;

a guard disposed over said opening;

a clamp connected to said light fixture, said clamp having two jaws pivotally connected to one another;

an electrical connection housing associated with said light fixture;

light source wires running from within said light fixture to within said electrical connection housing for supplying electricity to said light source; and an electrical power cord having power cord wires therein for connecting said lamp to said power source, said power cord wires being connected to said light source wires within said electrical connection housing.

17. The lamp of claim 16, further comprising an elongate support member having a first end connected to said light fixture and a second end connected to said clamp.

18. The lamp of claim 17, wherein said support member and said first of said two clamp jaws have respective elongate axes extending in substantially the same dimension.

19. The lamp of claim 18, wherein said support member is pivotally connected at a pivot point to said light fixture and said elongate axes of said support member and said first of said two clamp jaws pass substantially through said pivot point.

20. The lamp of claim 16, further comprising an elongate support member having a first end and a second end, and being connected at said first end to said light fixture and at said second end to said clamp, said electrical connection housing being disposed in said support member, said light source wires passing from said light fixture to said electrical connection housing.

21. The lamp of claim 16, wherein said light fixture, support member and clamp are made of metal, said power cord including a ground wire electrically connected thereto.

22. The lamp of claim 16, wherein said light source is a halogen light bulb, said light fixture having glass disposed over said cavity opening.

23. The lamp of claim 22, wherein said guard and said glass are connected to said light fixture by common attachment means.

24. The lamp of claim 23, wherein said guard comprises a wire grill.

25. The lamp of claim 16, wherein said guard comprises a wire grill.

26. A lamp, comprising:

a halogen light fixture, having a cavity therein for housing a light source and having an opening in said halogen light fixture to said cavity;

a support member having a first end, a second end and an elongate axis and being pivotally-connected at a first pivot point at said first end to said light fixture, said first pivot point having a pivot axis substantially perpendicular to said elongate axis of said support member; and a clamp connected to said support member at said second end thereof, said clamp having two jaws forced toward one another by spring tension, a first of said two clamp jaws being fixedly connected to said support member and the second of said two clamp jaws being pivotally connected at a second pivot point to said first clamp jaw, said clamp further including a spring connected to said first and second clamp jaws to force said two clamp jaws together and a handle connected to said second of said two clamp jaws at said second pivot point.

27. The lamp of claim 26, wherein said support member and said first of said two clamp jaws have respective elongate axes extending in substantially the same dimension.

28. The lamp of claim 27, wherein said elongate axes of said support member and said first of said two clamp jaws pass through said first pivot point.

29. The lamp of claim 26, further comprising an electrical connection housing associated with said light fixture, light source wires running from within said light fixture to within said electrical connection housing for supplying electricity to said light source, and an electrical power cord having power cord wires therein for connecting said lamp to a power source, said power cord wires being connected to said light source wires within said electrical connection housing.

30. The lamp of claim 29, wherein said electrical connection housing is disposed in said support member, said light source wires passing from said light fixture to said electrical connection housing.

31. The lamp of claim 26, further comprising a guard disposed over said opening.

32. A lamp, comprising:

a light fixture, having a cavity therein for housing a light source and having an opening in said fixture to said cavity;

a substantially rigid support member having a first end and a second end and being connected at said first end to said light fixture; and a clamp connected to said support member at said second end thereof, said clamp having two jaws, said support member and one of said two clamp jaws having respective elongate axes extending in substantially the same dimension, one of said clamp jaws having an elongate axis and two lateral axes, said elongate and lateral axes being substantially perpendicular to one another, said clamp jaws opening substantially along a first of said two lateral axes, the width of at least one of said two clamp jaws along the second of said two lateral axes inhibiting rotation of said clamp about said elongate axis.

33. A lamp, comprising:

a halogen light fixture;

an elongate support member having a first end, a second end and an elongate dimension, said support member being substantially rigid in said elongate dimension, said first end being connected to said halogen light fixture; and a clamp connected to said second end of said elongate support member, said clamp having two jaws forced toward one another by spring tension and a handle for spreading said jaws, said clamp being fixedly connected to said elongate support member so as to ensure that said jaws extend away from said second end of said elongate support member substantially along said elongate dimension of said elongate support member.

34. The lamp of claim 33, wherein said support member is pivotally connected to said light fixture.

35. A lamp, comprising:

a light fixture;

an elongate, substantially rigid support member having a first end, a second end and an elongate dimension and being connected at said first end to said light fixture; and a clamp connected to said light fixture, said clamp having two jaws forced toward one another by spring tension, a first of said two clamp jaws being fixedly connected to said support member so as to ensure that said first of two clamp jaws extends away from said elongate support member substantially along said elongate dimension, and the second of said two clamp jaws being pivotally connected to said first clamp jaw, said clamp further including a spring connected to said first and second clamp jaws and a handle for spreading said jaws.

36. The lamp of claim 35, wherein said elongate support member is pivotally connected to said light fixture so that said light fixture can rotate about an axis substantially perpendicular to said elongate dimension of said elongate support member.

37. The lamp of claim 35, wherein said elongate support member includes a pivot connection so that said light fixture can rotate about an axis in said elongate dimension of said elongate support member.

38. The lamp of claim 35, further comprising an electrical connection housing associated with said light fixture for receiving light source wires and an electrical power cord connected to said light source wires within said electrical connection housing.

39. The lamp of claim 38, wherein at least one of said light fixture, said elongate support member, and said clamp are made of metal, and said power cord includes a ground wire electrically connected thereto.

40. The lamp of claim 35, wherein said two clamp jaws are pivotally connected intermediate their ends.

41. A lamp, comprising:

a substantially rigid halogen light fixture having a cavity therein for housing a halogen light source and having an opening in said fixture to said cavity; and a clamp connected to said halogen light fixture at a position on said halogen light fixture, said position substantially establishing the center of a spherical coordinate system as to ensure that said jaws extend away from said position in a substantially radial direction, said clamp having two jaws forced toward one another by spring tension and a handle for spreading said jaws, said clamp being connected and said handle being spaced from said halogen light fixture so that said handle can be grasped without touching said halogen light fixture.

42. The halogen lamp of claim 41, wherein said two jaws are pivotally connected to one another intermediate their ends.

43. A lamp, comprising:

a halogen light fixture, adapted for receiving a halogen light bulb, and having a light transmissive cover and a protective guard over said cover;

an electric power cord adapted to connect said halogen light fixture to an electric power source;

an elongate support member having a first end, a second end and an elongate dimension, said support member being substantially rigid in said elongate dimension, said first end being connected to said halogen light fixture; and a clamp connected to said second end of said elongate support member, said clamp having two jaws pivotally attached to one another intermediate their ends and a spring for forcing said jaws toward one another at one end thereof, the other end of said jaws forming a handle for spreading said jaws, said clamp being connected so as to ensure that said clamp jaws extend away from said second end of said elongate support member, and said elongate support member being sufficiently long to ensure that said handle clears said halogen light fixture.

44. A lamp, comprising:

a light fixture, having a cavity therein for housing a light source and having an opening in said fixture to said cavity;

a support member having a first end and a second end and being connected at said first end to said light fixture;

an electrical connection housing associated with said light fixture;

light source wires running from within said light fixture to within said electrical connection housing for supplying electricity to said light source;

an electrical power cord having power cord wires therein for connecting said lamp to a power source, said power cord wires being connected to said light source wires within said electrical connection housing; and a clamp connected to said support member at said second end thereof, said clamp having two jaws forced toward one another by spring tension.

45. The lamp of claim 44, wherein said electrical connection housing is water sealed.

46. The lamp of claim 44, wherein said light fixture, electrical connection housing and clamp are made of metal and are in electrical contact with one another, and said power cord includes a ground wire connected to said electrical connection housing.

47. The lamp of claim 44, wherein said electrical connection housing is disposed in said support member, said light source wires passing through said support member from said light fixture to said electrical connection housing.

48. The lamp of claim 44, wherein said light source is a halogen light bulb.

49. The lamp of claim 44, further comprising a guard disposed over said cavity opening.

50. The lamp of claim 49, further comprising glass disposed over said cavity opening.

51. The lamp of claim 50, wherein said guard and said glass are connected to said light fixture by common attachment means.

52. The lamp of claim 49, wherein said guard comprises a wire grill.

* * * * *